United States Patent [19]

Orloff

[11] 4,373,158

[45] Feb. 8, 1983

[54] DEVICE FOR ALTERING ENCODED DATA

[76] Inventor: Leslie M. Orloff, 6 Roughriders Ct., Huntington, N.Y. 11743

[21] Appl. No.: 173,821

[22] Filed: Jul. 30, 1980

[51] Int. Cl.³ .................... H04Q 9/00; G06K 7/06; G06K 19/06

[52] U.S. Cl. .................... 340/825.3; 235/441; 235/492; 340/825.35

[58] Field of Search .......... 340/147 A, 149 R, 149 A; 235/441, 492, 488, 381; 365/96

[56] References Cited

U.S. PATENT DOCUMENTS

| | | | |
|---|---|---|---|
| 3,529,299 | 9/1970 | Chung et al. | 365/96 |
| 3,544,769 | 12/1970 | Hedin | 235/492 |
| 3,906,201 | 9/1975 | Housman et al. | 235/441 |
| 3,922,529 | 11/1975 | Orloff | 235/492 |
| 3,928,750 | 12/1975 | Wolflingeder | 235/492 |
| 4,130,889 | 12/1978 | Chua | 365/96 |
| 4,162,538 | 7/1979 | Thornburg | 365/96 |
| 4,195,358 | 3/1980 | Yuen | 365/96 |
| 4,256,955 | 3/1981 | Giraud | 235/492 |

*Primary Examiner*—Donald J. Yusko

[57] ABSTRACT

A record card having a plurality of bits arranged in a predetermined pattern, where at least one of these bits is adapted to be permanently "debited" by a corresponding apparatus. Each "debit bit" has a constricted neck which is adapted to be burned out by an electrical signal of predetermined magnitude and duration. The apparatus supplies this signal to the "debit bit"0 when the record is properly positioned and subsequently confirms that the bit has been properly debited.

4 Claims, 5 Drawing Figures

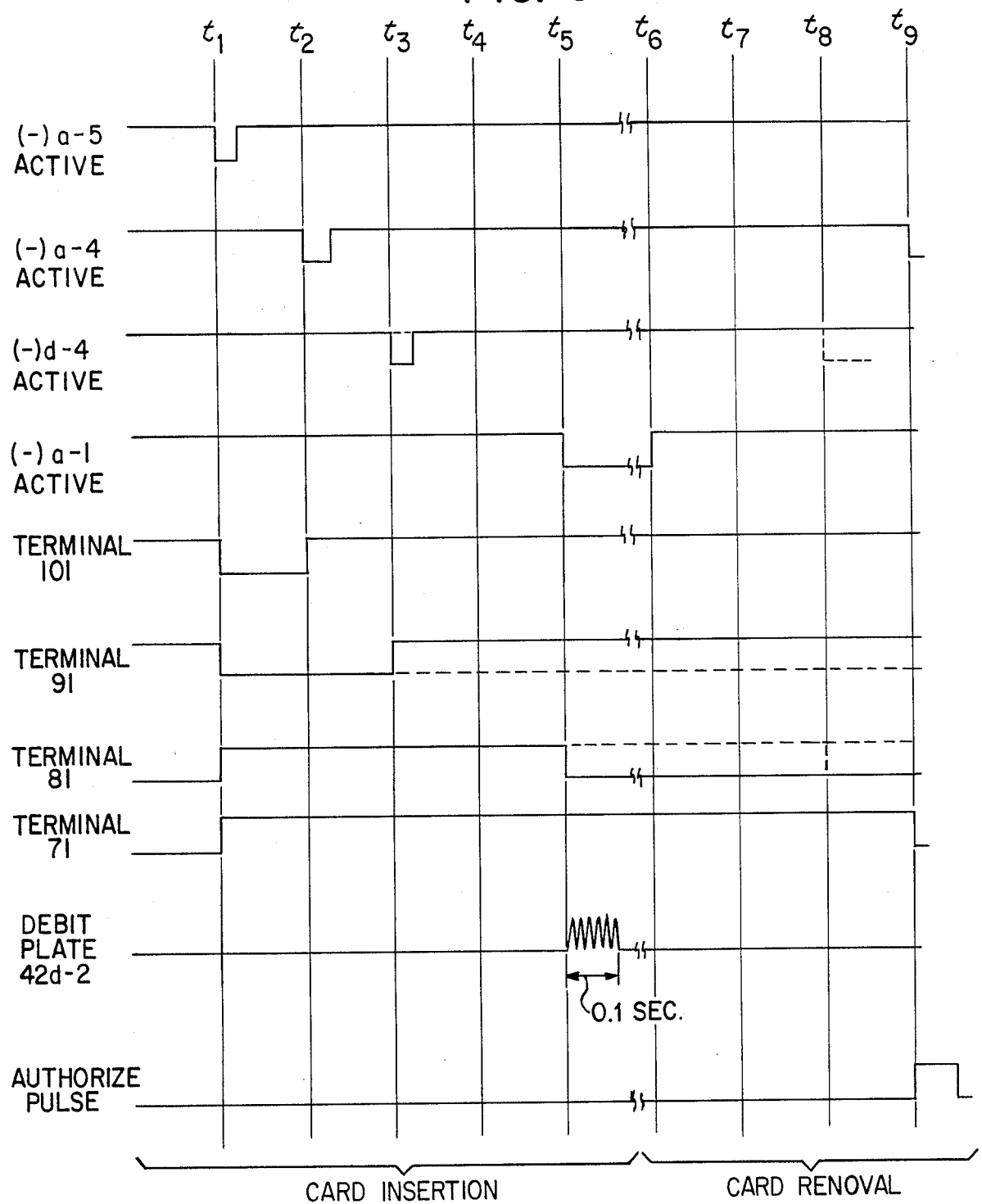

DEVICE FOR ALTERING ENCODED DATA

BACKGROUND OF THE INVENTION

U.S. Pat. No. 3,922,529 discloses an apparatus for reading data from a record medium which is in the form of a card or ticket having one or more pieces or "bits" of information in a pattern corresponding to a predetermined binary or alphanumeric information. The bits of information on the record are conductive in nature and remain unaltered during the reading process.

The present invention is directed to an improvement to such a record card and to the device for reading it whereby one or more of the bits of information on the card may be "erased" or "debited" during the process of reading the card.

The record card set forth by U.S. Pat. No. 3,922,529 includes a substrate of non-conductive material on which a plurality of information bits are arranged in a predetermined pattern. These bits are formed of a conductive material and are generally rectangular in shape. The substrate is covered with a non-electrically conductive protective material which is, preferably, opaque in nature so that the information bits are not visible.

This record is adapted to be placed within a "nest" of the reading apparatus so that the surface of the record which contains the information bits faces a sensor platen which forms the floor of the nest. The sensor platen includes a conductive strip which is connected to an electrical signal source, and a plurality of individual sensing plates which are arranged alongside the conductive strip in a pattern corresponding to the pattern of the information bits on the card. Each of the sensing plates are positioned to correspond to a particular information bit so that when the record is placed on the platen the conductive information bit will serve to bridge the gap between the conductive strip and the corresponding sensing plate thereby conducting the electrical signal from the conductive strip to the corresponding sensing plate. Each of the sensing plates is connected to a detector and the detected information may be decoded to determine the pattern of information bits on the card.

The reading apparatus described above is not capable of altering any of the data on the record card. Moreover, the data on the record card is essentially permanent in nature and cannot be altered by electrical means. Thus, the device is not adapted for applications in which it is desired to "erase" or "debit" one or more bits on the record card. An example of such an application is one in which it is desired that the record card be used as a single-use ticket. Such a ticket may be used to activate, for example, a subway turnstile or a closed circuit television set in a hotel room.

An example of a presently available type of record card which contains data which may be altered is a card on which the data is magnetically recorded. A disadvantage of such a card is that the data is relatively easy to tamper with. For example, it is possible to re-record a bit which had previously been debited thereby allowing re-use of the card. A further disadvantage of such a card is its relative susceptibility to environmental factors such as stray electromagnetic radiation.

SUMMARY OF THE INVENTION

The record card of the present invention offers the advantage of allowing one or more preselected bits to be permanently debited. After these bits are debited it is impossible to re-record them or to otherwise restore them to their original state.

The record card utilized in the invention is similar to that of U.S. Pat. No. 3,992,529 except that one or more bits at preselected positions on the card are defined as "debit bits." When a predetermined amount of current is passed through the bit, it acts like a fuse and breaks electrical continuity by either burning or melting away. Once this bit has been thus burned or melted it is impossible to reconstruct the electrical continuity of the bit and the debiting operation is thus permanent.

The record reader of the present invention is adapted to accept the record card through a slot in its housing rather than requiring that the card be placed in a nest as in the apparatus of U.S. Pat. No. 3,992,529. This feature is deemed to make the present apparatus more convenient to operate than was the previous apparatus.

As the card is being inserted into the slot it passes over a sensor platen which, like the sensor platen of U.S. Pat. No. 3,992,529, has a conductive strip and a plurality of sensor plates arranged in a predetermined pattern corresponding to the pattern of the data bits on the record card. In the platen of the present apparatus, however, the conductive strip does not pass alongside the plates associated with the debit bits. The present platen is provided with a second conductive strip which passes alongside the debit bit plate or plates. This second strip is connected to ground. The debit plates are positioned so that, when the record card is fully inserted into the slot, the debit bits on the card are aligned with their respective debit plates. At this time, an electrical signal, of predetermined magnitude and duration, is applied to the debit plate which is associated with the debit bit which is to be debited. This signal is coupled through the debit bit to ground via the second conductive strip. The resulting flow of current through the debit bit burns or melts away a portion of the bit and the debit bit is thus permanently debited.

The record card reading and debiting apparatus of the present invention embodies a number of other valuable features. For example, electronic means are provided for sensing the actual position of the card in the slot during its insertion and removal. When, during the insertion of the record card into the reading apparatus, the card reaches a first predetermined position, the debit bit is read to determine whether it has been previously debited. If it is determined that the debit bit was not previously debited, the debiting circuitry of the apparatus is conditioned to debit the debit bit when the record card reaches its fully inserted position. At this time the remainder of the bits on the record card may also be read.

When the record card reaches a predetermined position during its removal from the apparatus, the debit bit is again read to confirm that it has, in fact, been debited. If it is determined that the debit bit has been properly debited an "authorize pulse" is generated. This pulse may be utilized to activate a desired apparatus such as a subway turnstile or T.V. set.

It is, therefore, an object of the present invention to provide a record card which carries a number of bits of information, where at least one of these bits is adapted to be permanently altered by electronic means.

A further object is to provide an apparatus for reading the bits of information from such a record card and for permanently altering one or more of these bits.

A further object of the invention is that the above apparatus be capable of determining whether the predetermined bit had been previously altered.

A still further object of the invention is that the above apparatus be capable of confirming that a bit has been properly altered.

It is a still further object of the invention that the above apparatus be adapted to activate an apparatus such as a turnstile or a T.V. set if, and only if, a record card containing an unaltered bit is inserted into the apparatus and the bit is properly altered.

Other objects and advantages of the invention will become more apparent upon reference to the following specification and annexed drawings in which:

FIG. 5 is a timing diagram illustrating the sequence of operations which take place in the circuitry of the apparatus during the insertion and removal of a record card into and out of the apparatus.

DESCRIPTION OF THE PREFERRED EMBODIMENT

Figure 1:
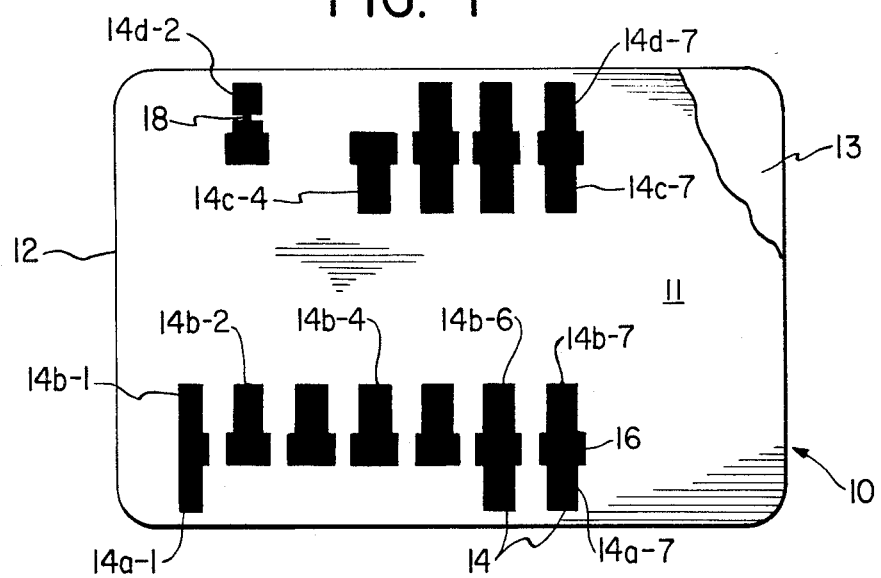
FIG. 1 is a plan view of a typical record card of the type utilized with the apparatus of the subject invention.

Referring to FIG. 1, a record card 10 which can be utilized with the present apparatus is shown in the generally rectangular shape of a standard credit card. It should be understood, however, that the record card 10 may be of any other convenient shape or dimensions.

The record 10 includes a substrate 11 of a non-electrically conducting material (e.g., plastic) and a protective coating 13. A plurality of information bits 14 which are formed of a conductive material are arranged on the substrate 11. In the embodiment illustrated these information bits 14 are arranged in four columns (a–d) and seven rows (1–7). Adjacent bits in the same row are arranged so that they share a common center portion 16. For example, the data bits 14a-7 and 14b-7 share a common portion 16.

In the present embodiment the bit 14d-2 is selected to be a "debit". In this embodiment of the invention such a debit bit is characterized by a constricted neck portion 18 which is adapted to melt or burn away when a predetermined amount of current is passed through it for a predetermined time. The dimensions of this neck portion determine the amount of current which must flow through the neck portion in order to burn it away and the duration of time required to produce such burning or melting. In a presently preferred embodiment the neck portion has a width in the order of 0.050 inches. A neck portion of such dimensions is adapted to burn away when a current in the order of 40–50 milli-amps is passed through it for approximately 0.1 seconds.

The substrate 11 of the record card 10 is completely covered with the non-conductive protective coating 13 which, preferably, is an opaque material so as to make the bits 14 invisible to the eye.

For reasons which will be discussed in further detail below, the presently preferred embodiment of the invention requires that data bit 14a-1 always be present on the record card 10 and that there be no bits present in the positions a-2 through a-5 of the card. This requirement enables relatively simple control circuitry to be utilized in the preferred embodiment of the reading and debiting apparatus. It will be appreciated, however, that alternate embodiments of the invention are possible in which no such restriction is required.

Figure 2:
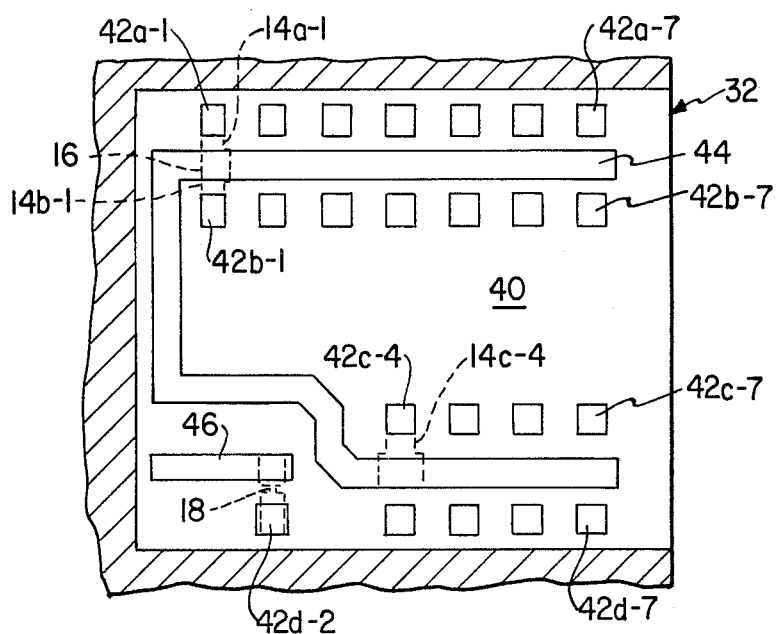
FIG. 2 is a top view of the apparatus with portions cut away to show the sensing platen.
Figure 3:
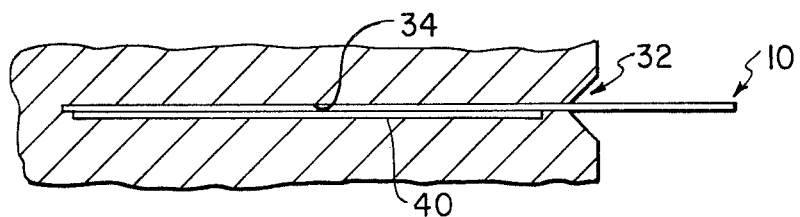
FIG. 3 is a side view, in cross-section of the housing of the apparatus.

FIGS. 2 and 3 show a portion of a housing 30 which contains the circuitry of the apparatus. The housing 30 includes a slot 32 which allows a record card 10 to be inserted into a compartment 34 in the housing. The bottom of this compartment 34 comprises a sensor platen 40 which may be a printed circuit board. A plurality of individual sensing plates 42 of electrically conductive material are arranged on the sensor platen 40. The sensor platen 40 also includes an electrically conductive strip 44. The sensing plates 42 are arranged in four rows (a–d) and seven columns (1–7) so that each of the sensing plates 42 will lie under a corresponding bit 14 of the record card 10 when the record card 10 is fully inserted into the compartment 34. The conductive strip 44 runs between plates 42a-1 through 42a-7 and plates 42b-1 through 42b-7, and between plates 42c-4 through 42c-7 and 42d-4 through 42d-8. Thus, when a record card 10 is fully inserted into the compartment 34, the conductive strip 44 will lie under the common portions 16 of the corresponding bits 14. In the embodiment illustrated by FIG. 2, the plate 42d-2 is utilized as a "debit plate" and lies under the debit bit 14d-2 when the record card 10 is fully inserted. A second conductive strip 46, which is connected to ground, is positioned to lie under the common portion 16 of the debit bit 14d-2 when the record card 10 is fully inserted.

An example of the manner in which the bits 14 are positioned relative to the plates 42 when the card 10 is fully inserted into the compartment 35 is shown in the upper left corner of FIG. 2. In the example the bits 14a-1, 14b-1 and their common portion 16 are illustrated by dotted lines. It will be noted that the bits 14b-1 and 14a-1 are aligned with their respective plates 42a-1 and 42b-1, and that the common portion 16 of the bits 14a-1 and 14b-1 is aligned with the portion of the conductive strip 44 between plates 42a-1 and 42b-1.

Referring to the bottom of FIG. 2, it will be noted that bit 14c-4 is aligned with plate 42c-4 but that in accordance with the pattern of bits illustrated by FIG. 1 there is no bit 14 present which corresponds to the plate 42d-4. It will also be noted from FIG. 2 that with the card 10 fully inserted the debit bit 14d-2 is positioned so that its common portion 16 is aligned with the second conductive strip 46, its neck portion 18 lies between the conductive strip 46 and the plate 42d-2 and the remainder of the bit is aligned with the plate 42d-2.

The sensor platen 40 operates in the following manner. Energy is fed from a suitable source, such as an oscillator, to the conductive strip 44. When the record card 10 is fully inserted into the compartment 34, each bit 14 on the record card 10 will couple energy from the strip 44 into the corresponding sensing plate 42 over which the bit is located. At a predetermined time an electrical signal is fed to the plate 42d-2 and is coupled to ground at the conductive strip 46 through the debit bit 14d-2. The resulting current flowing through the neck 18 of the debit bit 14d-2 causes the neck 18 to burn or melt thereby opening the conductive path between the common portion 16 of the debit bit and the remainder of the debit bit.

Figure 4:
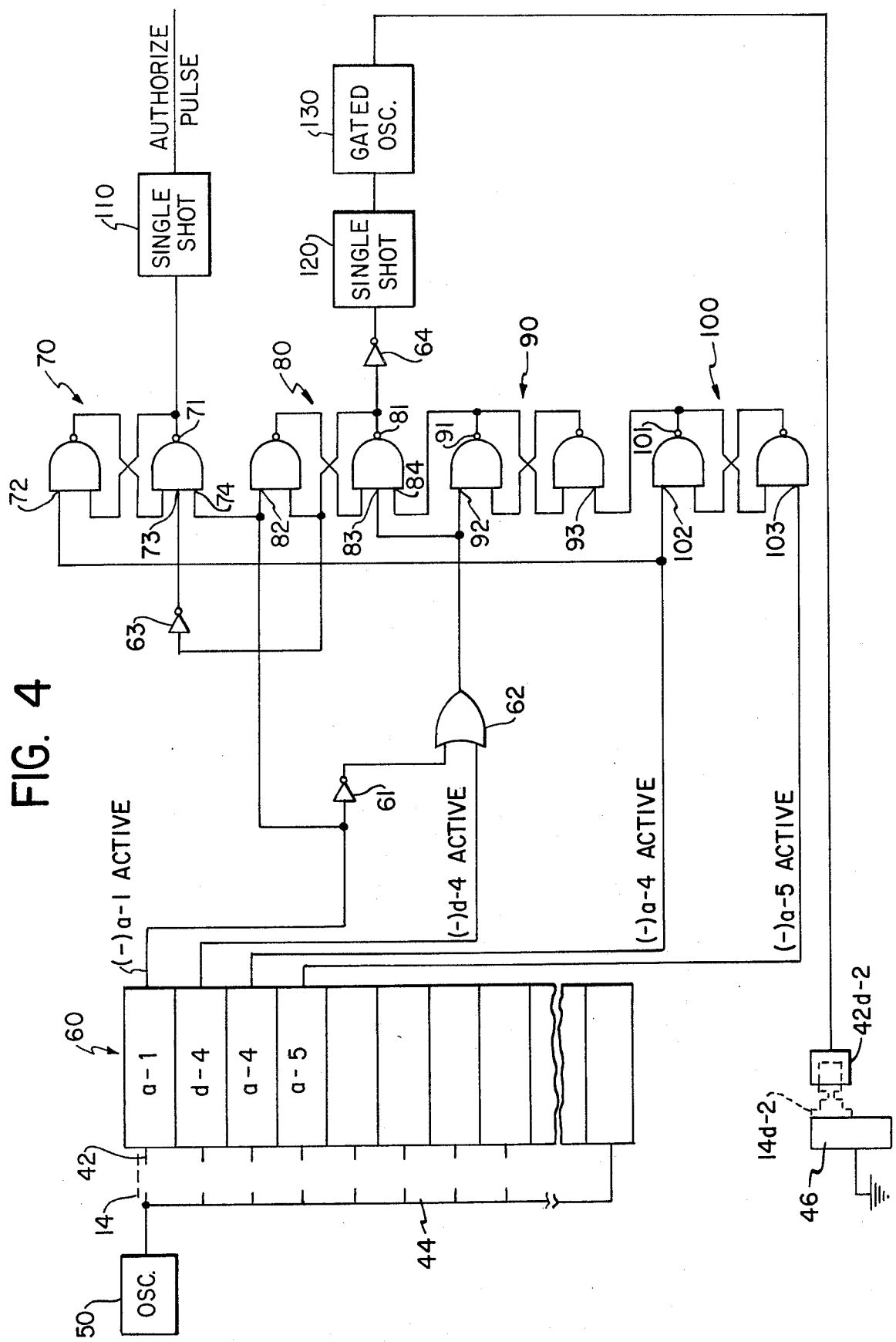
FIG. 4 is a block diagram of the apparatus circuitry.

FIG. 4 shows the details of an illustrative circuit which may be used to sense the presence of particular bits 14 on the record card 10, and to debit or burn out the debit bit 14d-2 on the card.

The source of energy for the plates 42 of the sensing platen 40 is illustratively shown as an RF oscillator 50. In the present embodiment this oscillator generates a signal having a frequency of approximately 30 MHz and may comprise an oscillator such as the one set forth for the same purpose in U.S. Pat. No. 3,922,529.

The output of the oscillator 50 is fed to the conductive strip 44 which is illustrated in schematic form in FIG. 4. Each plate 42, except for the debit plate 42d-2 is respectively connected to a detector circuit 60. The detector circuits described by U.S. Pat. No. 3,922,529 may be used for this purpose.

When a bit 14 becomes aligned with a particular plate 42, the space between the conductive strip 44 and that plate 42 is bridged, and energy from the oscillator 50 is coupled to that plate 42. The corresponding detector 60, normally having a high output, senses this energy and produces a low level at its output terminal in response to it. For example, the bit 14 is the upper left-hand corner of FIG. 4 (illustrated by a dotted line) couples energy from the conductive strip 44 to the plate 42a-1 thereby activating the detector 60a-1 to produce a low level at the output of the detector 60a-1 which is labeled "(−)a-1 ACTIVE". When the card 10 is fully inserted into the compartment 34, the output signals generated by detectors 60 correspond to the pattern of bits 14 on the record card 10. These signals may be fed to appropriate decoding circuitry such as that described in U.S. Pat. No. 3,922,529.

In the present embodiment, the output signals generated by detectors 60a-1, 60d-4, 60a-4 and 60a-5 are used to determine the relative position of the card 10 in the compartment 34 and to control the sequence of events which results in the debiting or burning out of the debit bit 14b-2. To accomplish this purpose the output terminals of the detectors 60a-1, 60d-4, 60a-5 are connected to the remainder of the circuitry shown by FIG. 4 as described below.

The output terminal of the detector 60a-5 is connected to the reset terminal 103 of a latch circuit 100. The output terminal of the detector 60a-4 is connected to the set terminal 102 of the latch circuit 100 and to the set terminal 72 of a latch circuit 70.

The output terminal of the detector 60a-1 is connected to a reset terminal 74 of the latch 70 and to a set terminal 82 of a latch circuit 80. The output terminal of the detector 60a-1 is also connected to the input terminal of an OR circuit 62 through an inverter circuit 61. The other input terminal of the OR circuit 62 is connected to the output of the detector 60d-4, and its output terminal is connected to a set terminal 92 of a latch circuit 90 and to a reset terminal 83 of the latch circuit 80.

The output terminal 101 of the latch circuit 100 is connected to a reset terminal 93 of the latch circuit 90 whose output terminal 91 is connected to a reset terminal 84 of the latch circuit 80. The output terminal 81 of the latch circuit 80 is connected through an inverter circuit 83 to a reset terminal 73 of the latch circuit 70. The output terminal 81 is also connected through an inverter circuit 64 to an input terminal of a single shot circuit 120 such as may be found on an SN 74123 integrated circuit module manufactured by Texas Instruments Inc. The output terminal 71 of the latch circuit 70 is connected to the input of another single shot circuit 110 which also may be of the type found on a Texas Instrument SN 74123 module. The output terminal of the single shot 120 is connected to an input terminal of a gated oscillator 140. The output terminal of the gated oscillator 130 is connected to the debit plate 42d-2.

Gated oscillator 130 provides the electrical signal for burning out the constricted neck portion 18 of the debit bit 14d-2.

It has been determined that a convenient signal for accomplishing this burning is one having several watts of RF power at approximately 40 Mhz. Such a signal will effectively burn out or melt the neck portion 18 of the debit bit in approximately 0.1 seconds. The single shot circuit 120 of the type described above is capable of being configured so as to produce an output pulse having a duration of approximately 0.1 seconds so as to activate the gated oscillator 130 for the appropriate period of time. Oscillator 130 may be constructed by conventional means and of conventional components in order to obtain the desired output frequency and power.

In the circuit described above, the latch circuits 70, 80, 90 and 100 may comprise the latches of a Texas Instrument SN 74279 integrated circuit module. Such latches are conventional, and various substitutions will be apparent to those skilled in the art.

Prior to describing the operation of the above circuit it will be helpful to compare the pattern of the bits 14 on the record card 10 illustrated by FIG. 1 with the pattern of the sensing plates 42 of the sensing platen 40 illustrated by FIG. 2.

The present illustrative embodiment utilizes the bit 14a-1 to generate timing pulses which control the sequence of events which occur in the circuitry illustrated by FIG. 4. Thus, in the present embodiment, it is required that the bit 14a-1 always be present on the card 10. By comparing FIG. 1 with FIG. 2 it will be appreciated that as the record card 10 is inserted into the compartment 34 the bit 14a-1 first passes over the plate 42a-7. It then passes successively over plates 42a-6 through 42a-2 and eventually comes to rest over plate 42a-1 when the card is fully inserted. During the time in which the bit 14a-1 is positioned over each of the plates 42 an output signal is generated at the output terminal of the detector 60 corresponding to that plate 42. As shown by FIG. 4 the output signals from the detectors 60a-1, 60a-4 and 60a-5 are utilized to provide inputs to the latches 70, 80, 90 and 100 which provide the sequence controlling signals for the remainder of the circuitry.

If a card 10 had bits present in positions a-2 through a-5, additional output signals would be generated by detectors a-4 and a-5 subsequent to the passage of the bit 14a-1 over the corresponding plates 42a-4 and 42a-5. In order to simplify the circuitry of the present embodiment it is therefore specified that there be no bits present in positions a-2 through a-5 of the record card 10. It will be appreciated, however, that means are well-known in the art for recognizing the first occurrence of a signal and for activating logical circuits only upon such a first occurrence of the signal. This means may take the form, for example, of a memory circuit which is set upon the occurrence of the signal and which is reset only upon the occurrence of some preselected subsequent event (e.g., the removal of the card 10 from the aperture 34). Furthermore, alternative means for generating signals which are related to the relative position of the card 10 in the compartment 34 (e.g., appropriately positioned microswitches) will also be apparent to those skilled in the art. Thus, although the present embodiment requires that there be no bits present at positions a-2 through a-5 of the card 10, this requirement is necessary only to properly activate the illustrative embodiment of the circuitry of the present invention illustrated by FIG. 4. This requirement would not be necessary if one of the numerous alternate means of accomplishing the functions of FIG. 4's circuitry are utilized. Moreover, the use of such alternative means would not depart from the spirit and scope of the present invention.

The operation of the circuitry of FIG. 4 may be best understood by referring also to the timing chart of FIG. 5.

Prior to the insertion of the card 10 into the compartment 34 there is no electrical interconnection between the conductive strip 44 and any of the plates 42. Thus, the output signals of all the detectors 60 are in a positive state. In particular, the "(—)a-1 ACTIVE" signal at the output terminal of the detector 60a-1, the "(—)a-4 ACTIVE" signal at the output terminal of the detector 60a-4, the "(—)a-5 ACTIVE" signal at the output terminal of the detector 60a-5 and the "(—)d-4 ACTIVE" signal at the output terminal of the detector 60d-4 are all in their positive or inactive states. As the card 10 of FIG. 1 is inserted into the compartment 34 it eventually reaches a position, at a time $t_1$, at which its bit 14a-1 is in a position corresponding to that of the 42a-5 of the sensor platent 40. At the time $t_1$, therefore, the detector 60a-5 causes its output signal (—)a-5 ACTIVE to become low as illustrated by FIG. 5. This low signal is fed to the reset terminal 103 of the latch 100 which causes the signal at the output terminal 101 of latch 100 to be reset to a low state. The low signal from terminal 101 is fed to the reset terminal 93 of latch 90 which causes the signal at the output terminal 91 of latch 90 to also be reset to a low state.

The low signal from terminal 91 is fed to the reset terminal 84 of the latch 80 which causes the signal at the output terminal 81 of latch 80 to be reset to a positive state.

The low signal at the terminal 81 is fed through the inverter circuit 63 so as to provide a low signal to the reset terminal 73 of the latch 70. The low signal at terminal 73 causes the signal at the output terminal 71 of latch 70 to become positive.

Thus, the passage of the bit 14a-1 over the plate 42a-5 causes latches 70, 80, 90 and 100 to be latched in their respective reset states. Moreover, as illustrated by FIG. 5, when the signal (—)a-5 ACTIVE returns to its positive state as a result of the bit 14a-1 moving away from the plate 42a-5 on its way to the plate 42a-4, latches 70, 80, 90 and 100 remain in their respective reset conditions.

At time $t_2$ the bit 14a-1 reaches a position corresponding to that of the plate 42a-4, and the detector 60a-4 causes the (—)a-4 ACTIVE signal to become low. This low signal is fed to the set terminal 102 of the latch 100 which causes the output signal at the output terminal 101 of latch 100 to be set to a positive state thereby removing the low resetting signal from the reset terminal 83 of latch 90. Latch 90 does not change its state at this time, however, because the (—)d-4 ACTIVE signal is still positive at time $t_2$ and the output of the OR circuit 62 is also positive. As will be noted from FIG. 4, the terminal 92 of the latch 90 requires a low setting signal which is not present since the output of the OR circuit 62 is positive. Since the state of the latch 90 does not change at this time it continues to provide a low signal to the reset terminal 84 of the latch 80 and a low signal is therefore also continued to be supplied to the reset terminal 73 of the latch 70. Thus, although a low (—)a-4 ACTIVE signal is fed to the set terminal 72 of the latch 70, latch 70 is prevented from changing its state by the continuing presence of a low signal at its reset terminal 73.

At time $t_3$ the bit 14a-1 is in a position corresponding to the plate 42a-3 but the resulting output signal from the detector 60a-3 does not cause any significant events to occur in the circuitry illustrated by FIG. 4. At time $t_3$, however, the debit bit 14d-2 is in a position corresponding to the plate 42d-4. Assuming that the electrical continuity of the debit bit 14d-2 has not been previously broken by the burning out of its constricted neck portion 18, the detector 60d-4 will cause its output signal (—)d-4 ACTIVE to become low at time $t_3$. This low signal is fed to the OR circuit 62 which causes the signal at the output terminal of the OR circuit 62 to also become low. The low signal from OR circuit 62 is fed to the set terminal 92 of latch 90 causing the signal at the output terminal 91 of latch 90 to become set to a positive state. The low signal from OR circuit 62 is also fed to the reset terminal 83 of latch 80 thereby maintaining latch 80 in its current reset state.

At the time $t_4$ neither the bit 14a-1 nor the debit bit 14d-2 are in positions which cause the generation of signals which are of any significance to the circuitry illustrated by FIG. 4.

At time $t_5$ the record card 10 is fully inserted. At this time the bit 14a-1 is in a position corresponding to the plate 42a-1 and the debit bit 14d-2 is in a position corresponding to the debit plate 42d-2. The positioning of bit 14a-1 over the plate 42a-1 activates the detector 60a-1 to cause its active signal (—)a-1 ACTIVE to become low. This low signal is fed to the set terminal 82 of latch 80 thereby setting the signal at the output terminal 81 of latch 80 into its low state. The signal from terminal 81 is fed through the inverter circuit 64 to the single shot circuit 120. The positive signal transition seen at the input of the single shot 120 causes the signal shot to generate an output pulse of predetermined duration (preferably in the order of 0.1 seconds). This pulse activates the oscillator 130 for a period of time corresponding to the duration of the pulse. The 40 MHz signal from oscillator 130 is fed to the debit plate 42d-2 from which it is coupled to ground at the conductive strip 46 via the debit bit 14d-2. The resulting flow of current through the constricted neck portion 18 of the debit bit 14d-2 results in the neck portion 18 being burned or melted away thereby "debiting" the debit bit 14d-2.

It will also be noted that at time $t_5$ the low (—)a-1 ACTIVE signal is also fed to the reset terminal 74 of latch 70. Since latch 70 is already in its reset state at time $t_5$, however, the feeding of a low signal to its reset terminal 74 has no further effect.

At this point the manner in which the above sequence of events would be modified in the event that the debit bit had been burned out prior to the insertion of the card 10 into the compartment 34 should be considered. If this were the case, at time $t_3$ the detector 60d-4 would not cause the d-4 active signal to become low even though the debit bit 14d-2 was in a position corresponding to the plate 42d-4 since no current would be conducted from the conductive strip 44 to the plate 42d-4. As illustrated by the dotted line of FIG. 5 the signal (—)d-4 ACTIVE would thus remain positive at time $t_3$. Since the transition of the (—)d-4 ACTIVE signal to a low state is necessary to set the output terminal 91 of latch 90 to a positive state at t₃, the signal at the output terminal 91 would consequently remain in its reset low state as also illustrated by dotted lines in FIG. 5. This holding of the output terminal 91 of the latch 90 in a low state insures that the reset terminal 84 of the latch 80 will be fed a low signal throughout the operations thereby keeping the latch 80 in its reset state. For this reason there is no low signal transition at the terminal 81 at time t₅ and single shot 120 is never activated to produce activating pulse for the gated oscillator 130. Thus, the circuitry of FIG. 4 insures that the gated oscillator 130 will never be activated to burn out a debit bit unless it has been previously determined that the bit to be debited has not been previously debited.

As described below, the circuitry of FIG. 4 also provides a check that a debit bit has in fact been properly debited. This check is provided during the removal of the record card 10 from the compartment 34.

At time t₆, the movement of the card 10 back from its fully inserted position is commenced and the bit 14a-1 moves away form the plate 42a-1. This causes the (—)a-1 ACTIVE signal from the detector 60a-1 to return to a positive level. This positive signal is fed to the reset terminal 74 of latch 70 and to the set terminal 83 of latch 80 thus removing the reset signal from terminal 74 and the set signal from terminal 82. It will be noted, however, that latch 70 which had previously been in a reset state remains in that state and that latch 80 which had previously been in a set state remains set.

At time t₇ the bit 14a-1 is positioned over plate 43a-2 and the signal generated by the corresponding detector 60a-2 is not of interest to the present discussion.

At time t₈ the bit 14a-1 is positioned over the plate 42a-3 and the debit bit 14d-2 is positioned over the plate 42d-4. The resulting signal generated by the detector 60a-3 is not of interest to the present discussion. If the debit bit has been properly debited as described above, its electrical continuity has been broken and, consequently, it does not provide an electrical path between the plate 42d-4 and the conductive strip 44. Under these conditions the signal at the output of the detector 60d-4 remains in a positive state as shown by the solid line representing the (—)d-4 ACTIVE signal at time t₈ in FIG. 5.

If, on the other hand, the electrical continuity of the debit bit 14d-2 has not been completely broken during the previous debiting operation, it will provide a conductive path between the plate 42d-4 and the conductive strip 44. Under these conditions the detector 60d-4 will cause the (—)d-4 ACTIVE signal to become low as indicated by the dotted line at t₈ on FIG. 5. This low signal is fed to an input of the OR circuit 62. Since at this time the other input of the OR circuit 62 is also at a low level by reason of the (—)a-1 ACTIVE signal to the inverter circuit 61 being positive, the output of the OR circuit 62 will become low. This low signal is fed to the set terminal 92 of latch 90 and to the reset terminal 83 of latch 80. Since the latch 90 is already set at this time, the low signal at its set terminal 92 does not cause the latch to change its state. The low signal at the reset terminal 83 of latch 80, however, causes latch 80 to reset and the signal at the output terminal 81 of latch 80 becomes positive as indicated by the dotted line on FIG. 5. The positive signal from terminal 81 is fed through the inverter circuit 63 thereby providing a low signal to the reset terminal 73 of latch 70. This low signal at terminal 73 holds latch 70 in its reset state.

At time t₉ the bit 14a-1 is positioned over the plate 42a-4 and the detector 60a-4 causes the (—)a-4 ACTIVE signal at its output to become low. This low signal is fed to the set terminal 102 of latch 100 which does not change its state since it is already in a set condition at this time. The low (—)a-4 ACTIVE signal is also fed to the set terminal 72 of latch 70. This low signal at terminal 72 will cause latch 70 to become set unless there is a low signal present at either of the reset terminals 73 or 74 of latch 70. Terminal 74 is positive at this time since the (—)a-1 ACTIVE signal from the detector 60a-1 is positive. Thus, if the signal at terminal 73 is positive, indicating that the debit bit 14d-2 has been properly debited, the low signal at terminal 72 will cause latch 70 to set and the signal at its output terminal 71 will go from a positive to a low state. This low signal transition activates the single shot 110 to generate an AUTHORIZE PULSE. Since the generation of this AUTHORIZE PULSE is dependent upon the proper debiting of the debit bit, the AUTHORIZE PULSE may, therefore, be utilized to condition appropriate circuitry for actuating an apparatus such as a television set, subway turnstile, or the like.

As previously noted, if the continuity of the debit bit 14d-2 had not been completely broken during the debiting operation, the signal at the reset terminal 73 of latch 70 would be low at time t₉. Under these conditions, the low signal at the set terminal 72 of latch 70 is prevented from setting the latch 70 and the AUTHORIZE PULSE is not generated. In order to procure an AUTHORIZE PULSE for the activation of the appropriate apparatus, therefore, it would be necessary to reinsert the record card 10 into the compartment 34 in order to properly debit the debit bit.

It will be understood that the foregoing description of an illustrative embodiment of the present invention is for the purpose of illustration only, and that various structural and operational features of the invention may be modified. For example, the record card 10 may be provided with more than one debit bit and the circuitry for controlling the debiting operation may be modified so as to debit one of these debit bits each time the card is inserted into the aperture 34. It will be appreciated, however, that such modifications would not depart from the spirit and scope of the present invention as defined in the appended claims.

What is claimed is:

1. Apparatus for altering and reading a record card of the type having a surface containing a plurality of electrically conductive bits arranged thereon in a predetermined pattern, at least one of said bits, at a predetermined location, being a debit bit adapted to be melted or burned away, said apparatus comprising:
    a housing having a compartment adapted to accept the record card;
    a source of an electrical debiting signal of predetermined power and duration;
    means for detecting the insertion of said card into a predetermined position in said compartment;
    means responsive to said detecting means for activating said debit signal source;
    means for coupling said signal to at least one of said debit bits;
    means for detecting whether the electrical continuity of said debit bit has been broken;
    means responsive to said continuity detecting means for disabling said activating means;

means responsive to said activating means and to said continuity detecting means for generating an authorize pulse; and means independent of said activating means for reading said electrically conductive bits.

2. Apparatus in accordance with claim 1 wherein said reading means comprises:

means for producing a radio frequency signal;

a sensor platen forming a wall of said compartment and adapted to face the surface of said record card containing said bits when said card is inserted into said compartment, said platen including a first conductive strip connected to said producing means;

a plurality of conductive plates adjacent but spaced apart from said first strip and arranged in a pattern corresponding to the pattern of said bits other than said debit bits on said record card so that upon full insertion of said record card into said compartment each of said bits will bridge said first strip and a respective plate to electrically couple said radio frequency signal from said first strip to said respective plate; and means electrically coupled to each of said plates for detecting the radio frequency signal coupled from said first strip to said plate;

and wherein said coupling means comprises:

a second conductive strip; and a conductive debit plate corresponding to each of said debit bits, adjacent but spaced apart from said second conductive strip and connected to said debit signal source so that upon full insertion of said record card into said compartment each of said debit bits will bridge said second strip and its respective debit plate to electrically couple said debit signal from said respective debit plate to said second strip.

3. Apparatus in accordance with claim 2 wherein said insertion detecting means comprises:

means for detecting the coupling of said radio frequency signal from said first strip to a first predetermined one of said plates by a predetermined one of said bits.

4. Apparatus in accordance with claim 3 wherein said continuity detecting means comprises means for detecting the coupling of said radio frequency signal from said first strip to a second predetermined one of said plates by a predetermined one of said debit bits.

* * * * *